United States Patent [19]

Bühler et al.

[11] Patent Number: 4,632,952

[45] Date of Patent: Dec. 30, 1986

[54] COATING COMPOSITIONS MADE OF PLASTISOLS OR ORGANOSOLS AND PROCESS FOR IMPROVING THE ADHESION OF THESE COMPOSITIONS TO METALLIC SUBSTRATES

[75] Inventors: Harald Bühler; Bernhard Statt, both of Hanau, Fed. Rep. of Germany

[73] Assignee: Degussa AG, Frankfurt, Fed. Rep. of Germany

[21] Appl. No.: 615,302

[22] Filed: May 29, 1984

[30] Foreign Application Priority Data

Jun. 1, 1983 [DE] Fed. Rep. of Germany ....... 3319849

[51] Int. Cl.$^4$ .......................... C09D 7/12; C09D 5/02; C09D 3/74; B05D 7/14

[52] U.S. Cl. .................................... 524/217; 524/210; 524/493; 524/567; 428/458; 156/330.9; 156/333

[58] Field of Search ................ 524/210, 217, 493, 567

[56] References Cited

U.S. PATENT DOCUMENTS

| | | | |
|---|---|---|---|
| 3,511,787 | 5/1970 | Bertorelli et al. ..................... | 106/288 |
| 4,167,611 | 9/1979 | Czarnecki et al. ..................... | 521/87 |
| 4,307,223 | 12/1981 | Shintani et al. ..................... | 523/450 |
| 4,324,739 | 4/1982 | Zondler et al. ......................... | 528/93 |
| 4,417,007 | 11/1983 | Salensky et al. ..................... | 523/459 |
| 4,417,008 | 11/1983 | Salensky et al. ..................... | 523/459 |
| 4,431,689 | 2/1984 | Gunter ................................. | 523/408 |
| 4,444,837 | 4/1984 | Blum et al. ............................ | 524/63 |
| 4,448,847 | 5/1984 | Bell et al. ............................... | 526/62 |

FOREIGN PATENT DOCUMENTS 2654871 6/1978 Fed. Rep. of Germany .
3113692 10/1982 Fed. Rep. of Germany .

OTHER PUBLICATIONS

Derwent Abs., 31363 D/18, Nippon Tokushu Toryo, J56024435, Mar. 1981.
Derwent Abs., 26213B/14, Teroson GmbH (3–1979) D52840996.
Derwent Abs., 11247C/07, Deutsche Solvay, DT2831848 (2–1980).
Derwent Abs., 83251 W/51, ICI (BE-831573) (Nov. 1975).

*Primary Examiner*—Herbert J. Lilling
*Attorney, Agent, or Firm*—Cushman, Darby & Cushman

[57] ABSTRACT

The invention is directed primarily to coating compositions, especially polyvinyl chloride (PVC) plastisols which are used especially as protective compositions for underlying bases. To improve the adhesion to metallic bases, the compositions contain 0.2–5 weight % of a hydrophobic silica.

11 Claims, No Drawings

COATING COMPOSITIONS MADE OF PLASTISOLS OR ORGANOSOLS AND PROCESS FOR IMPROVING THE ADHESION OF THESE COMPOSITIONS TO METALLIC SUBSTRATES

BACKGROUND OF THE INVENTION

The invention is directed to coating compositions made of plastisols and organosols which contain a polyaminoamide as an adhesive agent and to a process for improving the adhesion of these compositions to metallic bases. Plastisols are fluid dispersions of synthetic resins, especially polyvinylchloride (PVC), in plasticizers, which can contain additional fillers, dyes-pigments, and stabilizers.

Plastisols and organsols are frequently employed in the production of vehicles, for example, automobiles, e.g., as undercoat protective compositions, joint seals, or sound absorbents. As further areas of employment, there may be mentioned, e.g., the coating of pipes, textured materials and workpieces made of metal, as well as textile coatings.

They are applied by brushing, spraying, dipping, casting, or pressure processes.

After applying to the base customary PVC plastisols as a rule require gelling (fluxing) temperatures of 170°–190° C.

However, the trend, inter alia, to save energy, is continually to types of plastisols which will already guarantee sufficient gelation at about 140° C.

Of great significance in industrial use is the adhesive strength of the plastisols and organosols to the base.

PVC plastisols and organosols which do not contain special additives especially cause problems because of their poor adhesion to the metallic bases.

Therefore, it is customary to add adhesion improving polymerizable compounds such as, e.g., trimethylolpropane trimethacrylate.

However, therewith there must also be considered the simultaneous disadvantage that one must not go below a specific temperature level since otherwise the polymerization reaction of the adhesive agent will not start.

Recently, there have also been used polyaminoamides which are also effective at lower temperatures. In spite of this, the plastisols processed at these temperatures only show an unsatisfactory adhesion to the different metallic bases.

The problem of the invention is to develop a coating composition made of a plastisol or organosol which also has sufficient adhesive power to metallic bases at low temperature.

SUMMARY OF THE INVENTION

The subject matter of the invention is coating compositions of a plastisol or organosol which contain 1–7 parts of a polyaminoamide and which compositions also contain 0.2–5 weight % of a hydrophobic silica. Plastisols and organosols are suitable which contain as synthetic resin individually or in admixture predominantly PVC and vinyl chloride copolymers.

A further subject matter of the invention is a process for improving the adhesion of these compositions to metallic bases, e.g., made of iron, steel, aluminum, copper, or brass.

Preferably, there are employed vinyl chloride polymers which gel at a temperature of 100° to 200° C., especially at 140° to 180° C.

There can be used both vinyl chloride suspension and emulsion polymers and for the copolymers there can be used suitable monomers such as, e.g., vinyl acetate. Examples of these types of plastisols are the Solvic ® type of Series 300 (Solvay GmbH) or the Vinnol ® type of the P100 series (Wacker).

There can be mentioned as a suitable polyaminoamide Euretek ® 505 (Schering AG), and those mentioned in German Pat. No. 2654871.

German Pat. No. 2654871 shows preparation of polyaminoamides by reacting polymerized fatty acids with polyalkylene polyamines, e.g., reaction a polymerized fatty acid having a saponification number of 196 with triethylenetetramine.

It is customary to employ highly dispersed pyrogenic silicas to regulate the rheological properties of plastisols. For this purpose, there are used hydrophilic types such as, e.g., AEROSIL ® 200; which also has a favorable influence on the flooding behavior of the pigment. By addition of pyrogenic silicas, the sedimentation behavior of coarse particle fillers, such as, e.g., barite or chalk in plastosils and organosols is favorably influenced. The addition of 0.2–5 wt. %, preferably 0.5 to 1.5 wt. % of a hydrophobic silica based on the amount of plastisol in contrast leads to a clear improvement of the plastisol adhesion to metallic bases.

The hydrophobic silicas usually have alkylsilane groups attached to the silica as hydrophobizing agents.

The hydrophobic silica is mixed into the plastisol with the customary apparatus.

As hydrophobic silica, there can be used alone or in admixture the precipitated silicas or those of high temperature hydrolytic (pyrogenic) origin which have been hydrophobized with organosilane compounds, e.g., dimethyldichlorosilane or with polymers, e.g., silicone oil (a dimethyl polysiloxane). Illustrative hydrophobic silicas are those mentioned in Lumbeck U.S. Pat. No. 4,274,883 and Ettlinger U.S. Pat. No. 4,307,023. The entire disclosures of the Lumbeck and Ettlinger patents are hereby incorporated by reference and relied upon.

Their average primary particle size is between 7 and 85 nm.

They have a specific surface area of 50 to 700 $m^2/g$, preferably from 100 to 300 $m^2/g$.

Especially suited are hydrophobized pyrogenic silicas, such as, e.g., AEROSIL R972 or R974.

As the substrate (base), there is preferably used a primed iron sheet. There can be used iron sheets that have been primed either electrophoretically or by customary baking.

The composition can comprise, consist essentially of, or consist of the stated materials; and the process can comprise, consist essentially of, or consist of the stated steps with the recited materials.

Unless otherwise indicated, all parts and percentages are by weight.

DETAILED DESCRIPTION

The following examples demonstrate the superiority of the plastisols of the invention, which are especially suited as protective compositions for base structures.

The basic mixture of the coating composition consists of:

| | | |
|---|---|---|
| 100 | parts PVC (pastable) | |
| 150 | parts plasticizer mixture | { Dioctylphthalate / Di-3,5,5trimethylhexylphthalate } 1:1 |
| 91 | parts chalk | |
| 7 | parts aliphatic solvent (Shellsol ® K) | |
| 2 | parts barium-cadmium-zinc-stabilizer (Irgastab ® BC206) | |
| 3.5 | parts CaO | |
| 5 | parts modified polyaminoamide (Euretek ® 505) | |

The basic mixture is designated Sample 1. Sample 2 contains additionally 5.5 parts (=1.5 wt. %) of Aerosil ® 200 (hydrophilic pyrogenic silica, BET surface area 200 m²/g), and Sample 3 contains additionally 5.5 parts of Aerosil ® R972 (hydrophobic pyrogenic silica made by using dimethyldichlorosilane as the hydrophobizing agent, BET surface area 130 m²/g).

There were brushed wedge shaped films from the pastes thus formed, the films having an increase in thickness from 0 to 1000 μm in a length of 10 cm on a deflated, cathodic, dip lacquered automobile body sheet iron. The gelation was carried out by heating the coated sheet for 20 minutes at 140° C. To test the adhesion after storing in a salt spray test chamber, the films were notched with a knife opposite to the direction of the wedge and attempts made by hand to loosen the coating from the base. After storing for 14, 25, and 36 days, in each case it was found that only Sample 3 which contained the hydrophobic silica could not be loosened from the sheet. The films from the samples without the addition of silica could be clearly scaled off at 1 cm width. Films from the samples with hydrophilic silica in contrast were slightly more difficult to scale off but were far below the films of Sample composition 3 in the adhesion to the base sheet.

The entire disclosure of German priority application P No. 3319849.7 is hereby incorporated by reference.

What is claimed is:

1. In a plastisol or organosol coating composition containing a polyaminoamide as an adhesive agent the improvement comprising including based on the entire composition 0.2-5 weight % of a hydrophobic silica whereby the ability to adhere to a metallic base is improved.

2. A composition according to claim 1 wherein the composition is a plastisol containing a vinyl chloride polymer.

3. A composition according to claim 2 containing 0.5 to 1.5 wt.% of the hydrophobic silica.

4. A composition obtained by gelling the composition of claim 1.

5. A composition obtained by gelling the composition of claim 2.

6. A composition obtained by gelling the composition of claim 3.

7. A composition according to claim 1 containing 1-7 parts of polyaminoamide.

8. A composition according to claim 2 containing 1-7 parts of polyaminoamide.

9. A composition according to claim 3 containing 1-7 parts of polyaminoamide.

10. A composition according to claim 5 containing 1-7 parts of polyaminoamide.

11. A composition according to claim 6 containing 1-7 parts of polyaminoamide.

* * * * *